US006929550B2

(12) United States Patent
Hisada

(10) Patent No.: US 6,929,550 B2
(45) Date of Patent: Aug. 16, 2005

(54) NETWORK GAME METHOD AND NETWORK GAME SYSTEM

(75) Inventor: Hiromichi Hisada, Tokyo (JP)

(73) Assignee: Sega Corporation (JP)

(*) Notice: Subject to any disclaimer, the term of this patent is extended or adjusted under 35 U.S.C. 154(b) by 0 days.

(21) Appl. No.: 09/951,438

(22) Filed: Sep. 14, 2001

(65) Prior Publication Data

US 2002/0034981 A1 Mar. 21, 2002

(30) Foreign Application Priority Data

Sep. 21, 2000 (JP) ....................................... 2000-286968

(51) Int. Cl.7 ................................................ A63F 13/00

(52) U.S. Cl. ............................ 463/42; 463/40; 463/16; 463/25

(58) Field of Search ......................... 463/40–42, 16–29, 463/1

(56) References Cited

U.S. PATENT DOCUMENTS 5,564,977 A * 10/1996 Algie .......................... 463/25
5,575,474 A * 11/1996 Rossides ...................... 463/26
5,795,226 A * 8/1998 Yi ............................... 463/22
5,971,855 A * 10/1999 Ng .............................. 463/42
6,050,895 A * 4/2000 Luciano et al. ................ 463/7
6,500,070 B1 * 12/2002 Tomizawa et al. ............ 463/43

FOREIGN PATENT DOCUMENTS

| | | |
|---|---|---|
| DE | 19802684 A1 | 12/1998 |
| JP | 08-000829 | 1/1996 |
| JP | 2000-197771 | 7/2000 |
| JP | 2002-045577 | 2/2002 |
| WO | WO 97/09699 | 3/1997 |
| WO | WO 98/26361 | 6/1998 |
| WO | WO 00/25876 | 5/2000 |
| WO | WO 00/30729 A1 | 6/2000 |
| WO | WO 00/30729 | 6/2000 |
| WO | WO 01/51146 A1 | 7/2001 |

* cited by examiner

*Primary Examiner*—Jessica J. Harrison
(74) *Attorney, Agent, or Firm*—Dickstein Shapiro Morin & Oshinsky LLP

(57) ABSTRACT

The present invention provides a second network game (for example, a betting game) using the results of a first network game (for example, a horse racing game), wherein third party users other than users running a first network game can participate. A greater number of users will thereby have interest in the first network game and the first network game will be built up. Also, a greater number of users can participate in a network game through the second network game.

3 Claims, 15 Drawing Sheets

NETWORK GAME METHOD AND NETWORK GAME SYSTEM

BACKGROUND OF THE INVENTION

1. Field of the Invention

The present invention relates to a method for performing a network game over a computer network and a network game system.

2. Description of the Related Art

A popular genre of computer games is simulation gaming or so-called training gaming. In training gaming, an object to be trained such as a baseball or soccer team, or racehorse is trained and caused to compete against other teams or racehorses in the game. In this specification, the term of "competitive games" is used not only for games in which two users compete against each other, but also for competitive games in which three or more users competing for victory against one another.

When these training games are played on a stand-alone computer gaming device, separate opponents such as teams or horses are prepared in advance within the game program. The game user (hereinafter "user") plays the team or racehorse developed by him or herself against the pre-existing opponents.

Meanwhile, the recent spread of computer networks has made it possible to play against the object trained by other users by connecting the computer gaming devices over a network. In otherwords, the data for the objects trained by each of a plurality of users is uploaded to a prescribed server through the network and the competition among the users' own trained objects takes place on the server. By using networks in this way, users can play their own trained objects against a wider variety of opponents and the game therefore becomes more enjoyable.

SUMMARY OF THE INVENTION

It is an object of the present invention to provide a network game method and network gaming system to make network gaming carried out through a network more enjoyable and to allow the participation of a greater number of people.

To achieve the above object, the present invention provides a second network game (for example, a betting game) using the results of a first network game (for example, a horse racing game), wherein third party users other than users running a first network game can participate in the first network game. A greater number of users will thereby have interest in the first network game and the first network game will be built up. Also, a greater number of users can participate in a network game through the second network game.

DESCRIPTION OF THE PREFERRED EMBODIMENTS

The preferred embodiments of the present invention are explained below. However, the technical scope of the present invention is not limited to these embodiments. In the following embodiments, the network game method is explained using a racehorse training game as an example.

Figure 1:
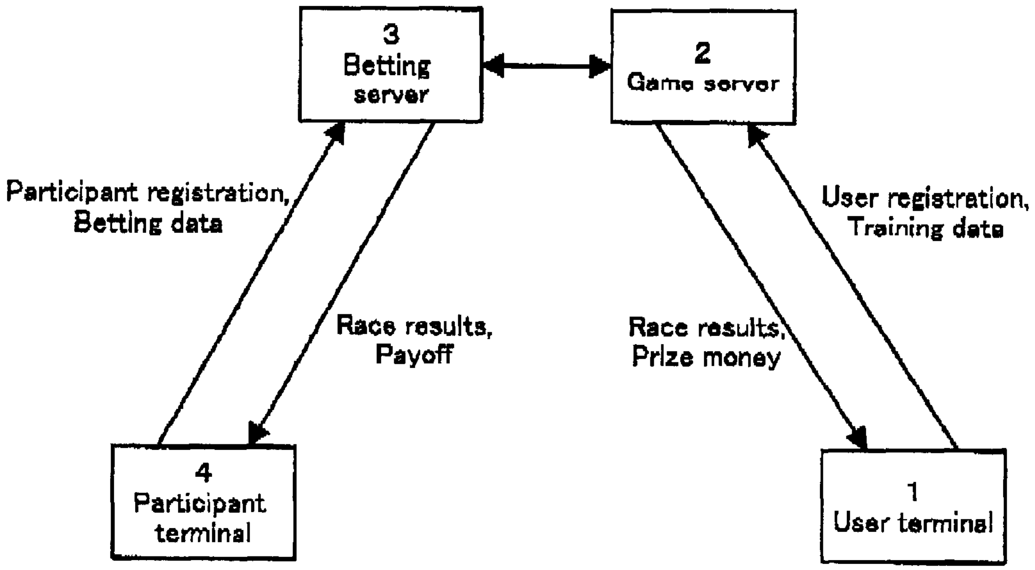
FIG. 1 is a block diagram of the network gaming system for executing the network game method in an embodiment of the present invention.

FIG. 1 is a block diagram of the network gaming system for executing the network game method relating to the embodiment of the present invention. First, this embodiment is explained in general using FIG. 1. The user runs a racehorse training game on his or her own computer game terminal (user terminal) 1 and generates his or her own racehorse data. Each user uploads his or her own racehorse data to the game server 2 through a network such as the Internet. The game server 2 collects the uploaded racehorse data, reads the racehorse data at the time a race is held, and holds a virtual horse race among the racehorses developed by each user.

In the present embodiment, a third party user other than the users who created racehorses (hereinafter "participant") can participate in a virtual horse race by accessing the betting server 3 through his or her own network terminal (participant terminal) 4. Specifically, the participant can predict which racehorse will win and bet virtual money on that race horse. If the participant's predicted racehorse wins the race, then the participant can receive a payoff of virtual money calculated by multiplying the bet amount by a predetermined number. The users can receive prices of virtual money when their own racehorses win the virtual horse races. Virtual money is a currency that is valid only on the network and maybe exchanged for products or cash and credit and can be used for various types of discounted services on the network.

In this way, the present embodiment makes possible participation in virtual horse races held on the game server 2 by users other than the users playing the training game.

The participants can bet on the races held on a virtual race track. It thereby becomes possible for a greater number of people to participate in the virtual horse races and the entertainment value of the virtual horse races held on the server 2 are further enhanced. Also, it becomes possible to satisfy the desire of most users to present one's own racehorse to a greater number of participants.

Figure 2:
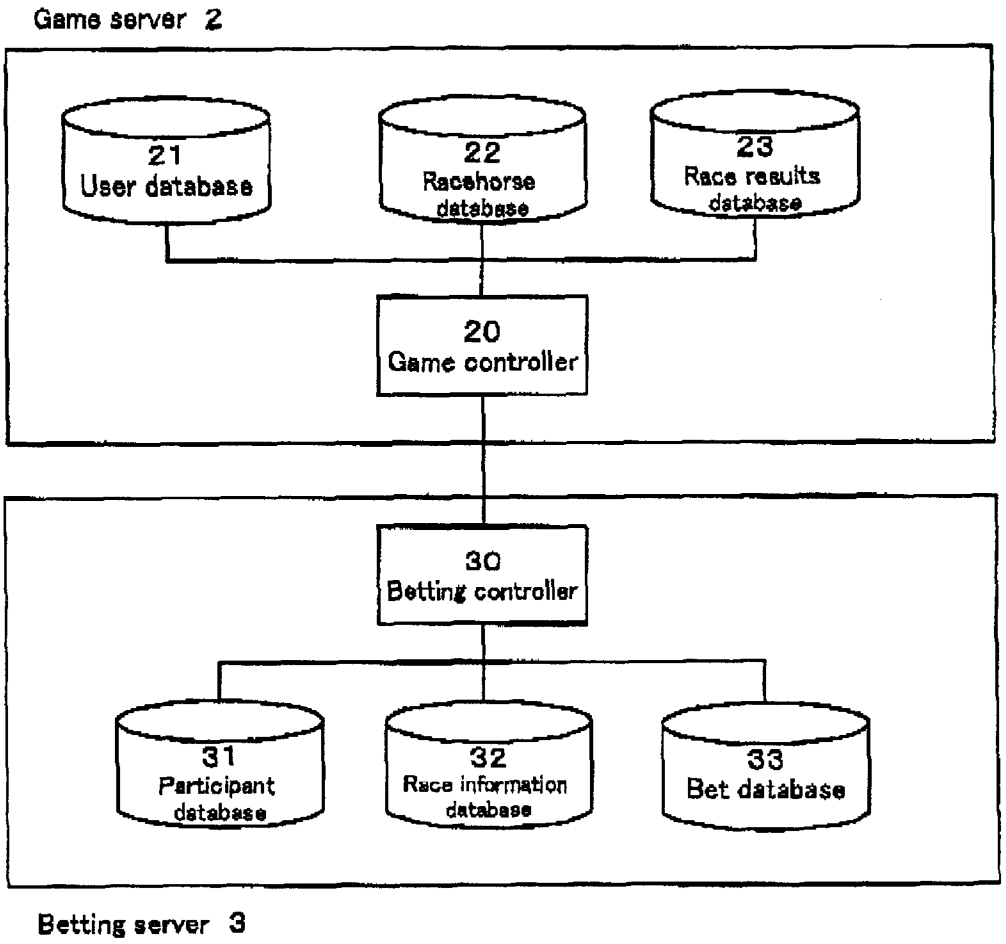
FIG. 2 is a block diagram of the game server 2 and betting server 3.

FIG. 2 is a block diagram of the game server 2 and betting server 3. The game server 2 and betting server 3 may be the same device or separate devices. The game server 2 runs the horse race game over the network as in the prior art. Specifically, the game controller 20 in the game server 2 registers users who wish to enter their own racehorses in the virtual horse race. Moreover, users operate their user terminals 1 in advance and run the racehorse training game. At this time, the user terminal 1 does not need to be connected through the network to the game server 2. As the user advances through the training game, the user terminal 1 generates data for the racehorse developed by the user.

After generating racehorse data, the user connects the user terminal 1 to the game server 2 through the network and user data are registered in the user database 21 on the game server 2 by the user inputting user information (user name, electronic mail address, name of the race to be entered, etc.). At this time, the racehorse data are also uploaded and the racehorse data are stored in the racehorse database 22. The game controller 20 reads the racehorse database when the time for the race arrives and holds the virtual horse race by executing a prescribed race program. The race results are stored in the race results database 23.

Moreover, in the case where a large number of racehorses are registered to participate in a prescribed race, it is not possible for all the racehorses to run in the race. Consequently, preliminary races are held for each race and only a prescribed number (for example, 15) of horses, from among the registered horses, who won the preliminary races can run in the race (main race). As discussed below, when the time period for registering for a prescribed race passes, the game controller 20 reads the racehorse data from the racehorse database 30 before running that main race, divides the racehorses registered for that race into a plurality of groups, holds tournament-style preliminary races, and selects a prescribed number of racehorses from among those who won the preliminary races. Consequently, racehorses who lost at the level of the preliminary races cannot run in the main race. The results of these preliminary races are also stored in the race results database 23. For example, preliminary races may be held from Monday through Friday and the main race on Sunday. The results of the preliminary races may be sent to all the users by electronic mail, for example. Also, a preliminary results web site (not shown) showing the preliminary results for the racehorses of each user may be provided on the Internet by the game server 2.

As discussed above, the present embodiment provides a separate network game in which other users (hereinafter "participants") can participate in the network gaming based on data uploaded by users (a horse race game, for example). For example, the separate network game is a betting game for betting on the results of the network game. The betting game for betting on the race results of the horse race game held on the network is explained below.

The betting server 3 provides a virtual horseracing site on the Internet and participants can bet on the virtual horse races by accessing that server and following prescribed procedures. Specifically, the betting controller 30 on the betting server 3 reads the databases explained below on the basis of communication from the participant terminal 4 and carries out registration and update processing, while generating HTML files to be displayed on the screen of the participant terminal 4 and sending those files to the user terminal 4.

Figure 3:
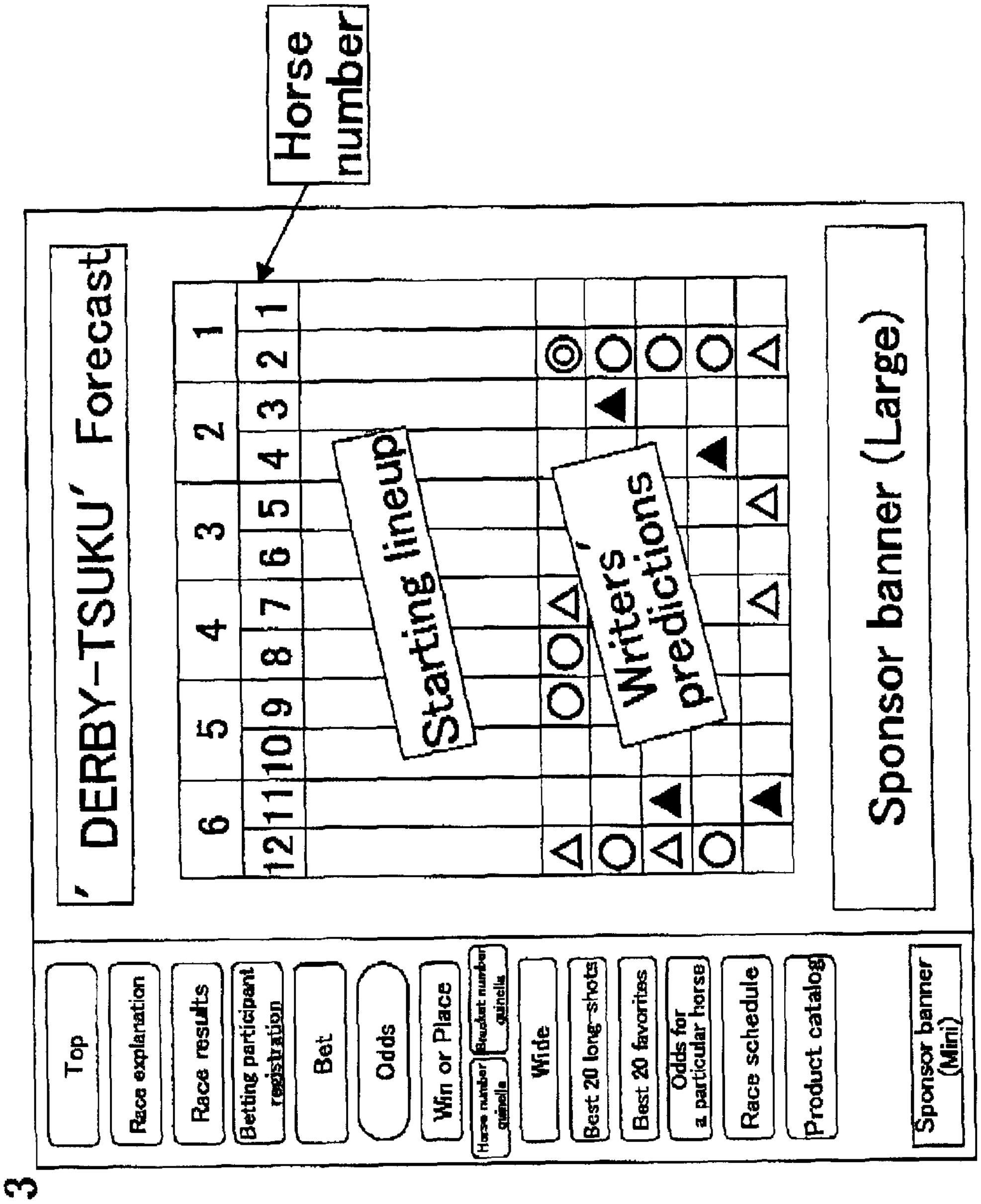
FIG. 3 is an example of a top menu screen for a virtual horseracing site.

FIG. 3 is an example of the top menu screen for a virtual horseracing site. FIG. 3 shows the starting lineup and the forecast information (writer's forecast); various items relating to participation in the virtual horse race (for example, betting) are displayed on the left side of the screen. For example, clicking on "Race explanation" will display a screen explaining the rules for participating in virtual horse races. Clicking on "Race results" will display a screen showing the results of races that have already been held. Clicking on "Betting participant registration" will display a new registration screen for betting on the race or a screen for confirming one's virtual money balance. Clicking on "Bet" will display screen for betting on each race. Clicking on "Odds" will display a screen of the odds of each race. Clicking on "Race schedule" will display a screen of the schedule of the races held at the virtual race track. Clicking on "Product catalog" will display a screen of products for which virtual money can be exchanged.

Figure 4:
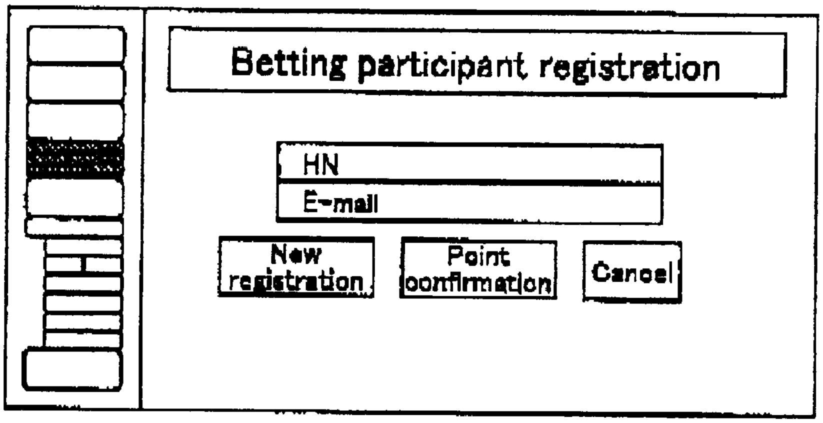
FIG. 4 is an example of a bet registration screen.
Figure 5:
FIG. 5 is an example of a new registration confirmation screen.

The processing of the betting controller 30 is explained below with reference to the example screens. The betting controller 30 registers participants who are betting on races held at the virtual race track. When the participants click on "Bet registration" on the top menu page shown in FIG. 3, the betting registration screen shown in FIG. 4 is displayed on the participant terminal 4. Following the screen in FIG. 4, the participant inputs participant data such as the participant's name (HN) and electronic mail address (E-mail) and clicks on the "New registration" button. Thereupon, as the new registration confirmation screen shown in FIG. 5 is displayed, the betting controller 30 stores the participant data in the participant database 31. The betting controller 30 also sends the password for participating in races separately to the participant by electronic mail.

Moreover, the participant must purchase virtual money, which is money for betting on the virtual horse races, in advance. Virtual money may be purchased at a vending site, not shown; the participant purchases the desired amount of virtual money by registering his or her credit card number in advance. The balance of the virtual money purchased by the participant is managed in the participant database 31.

Figure 6:
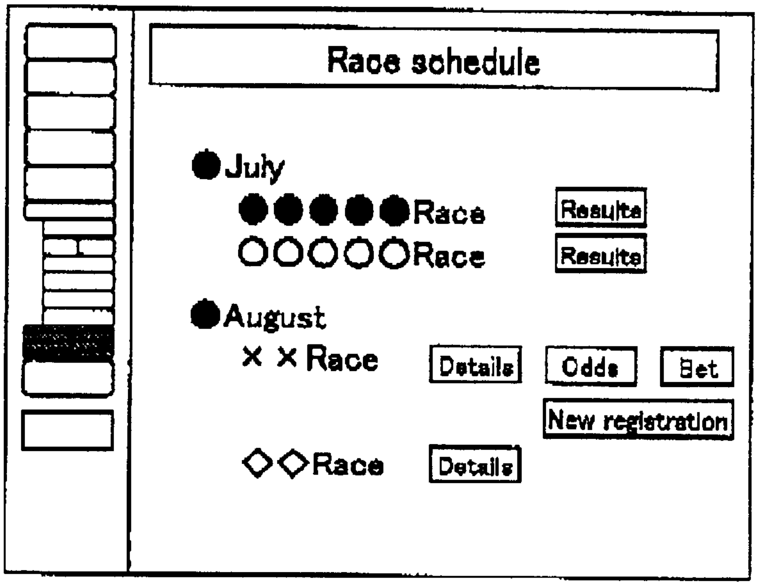
FIG. 6 is an example of a race schedule screen.
Figure 7:
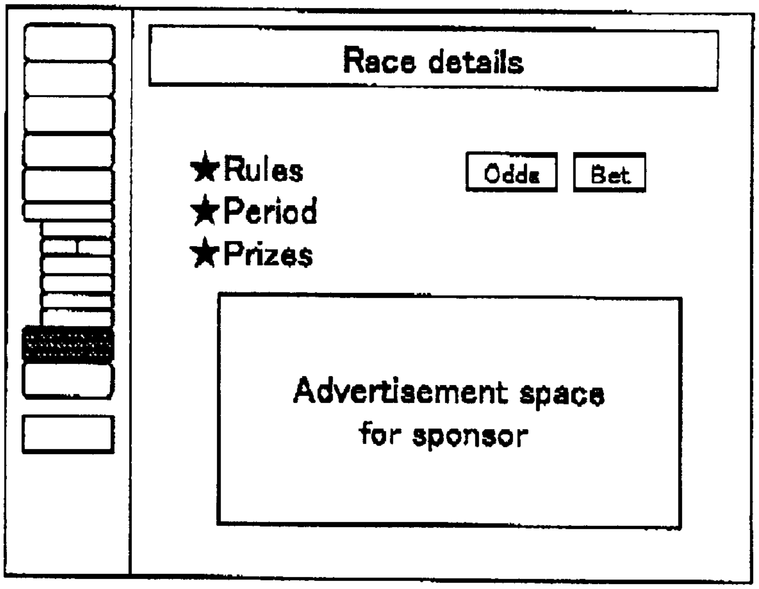
FIG. 7 is an example of a race details screen.
Figure 8:
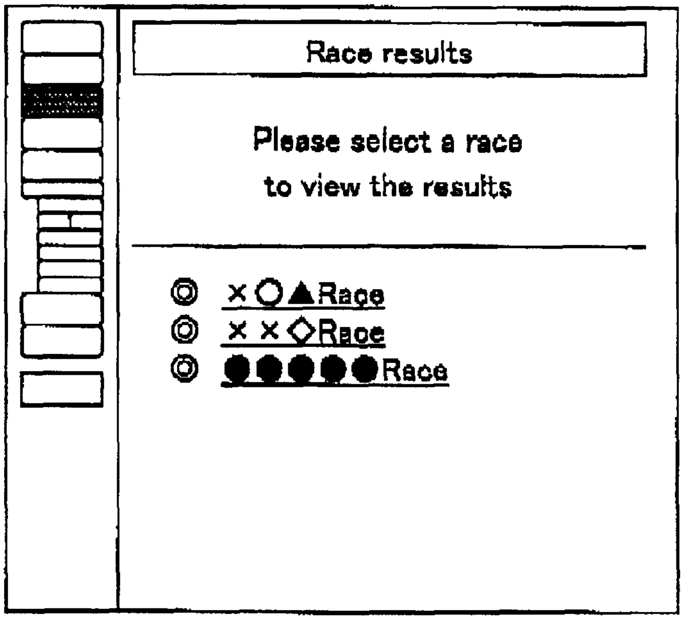
FIG. 8 is an example of a race results selection screen.
Figure 9:
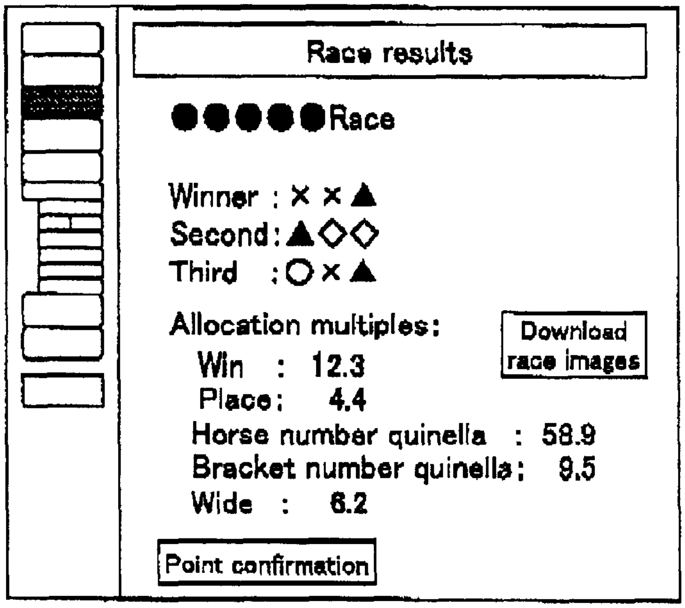
FIG. 9 is an example of a race results screen.
Figure 10A:
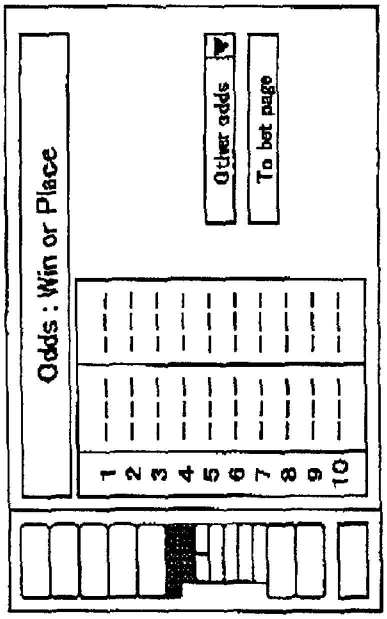
FIG. 10 is an example of an odds screen.
Figure 10B:
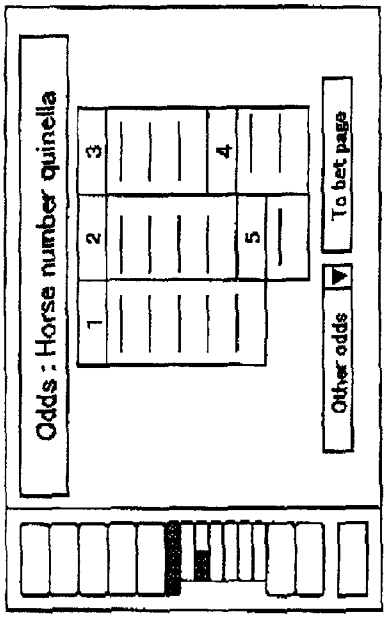
Figure 10C:
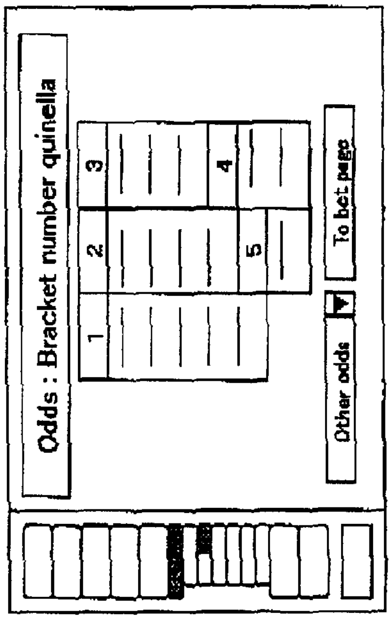
Figure 10D:
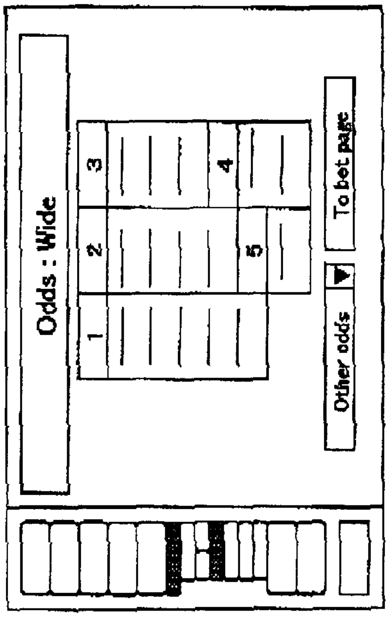
Figure 11A:
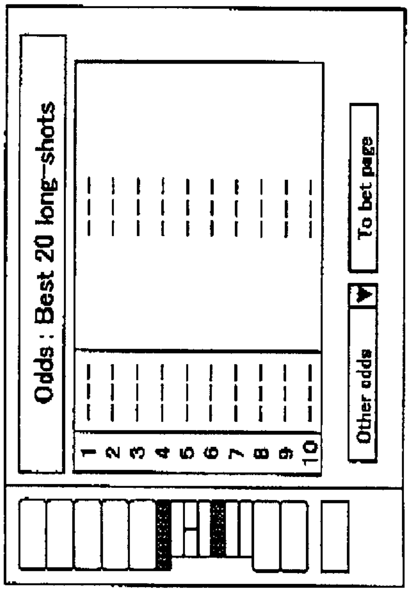
FIG. 11 is an example of an odds screen.
Figure 11B:
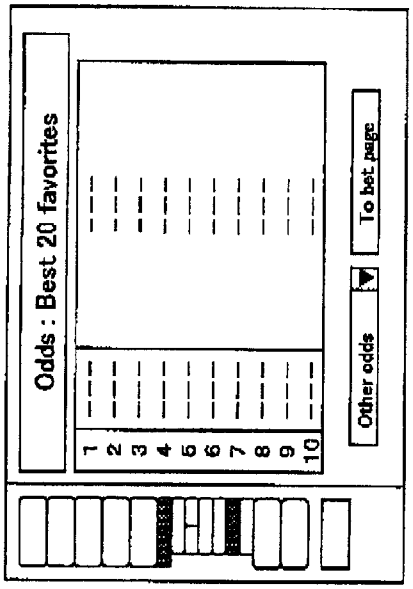
Figure 11C:
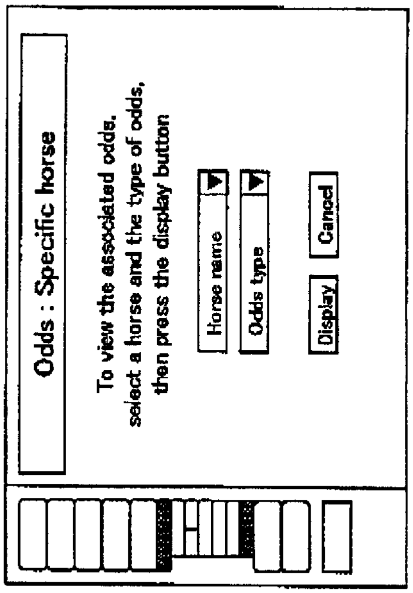
Figure 11D:
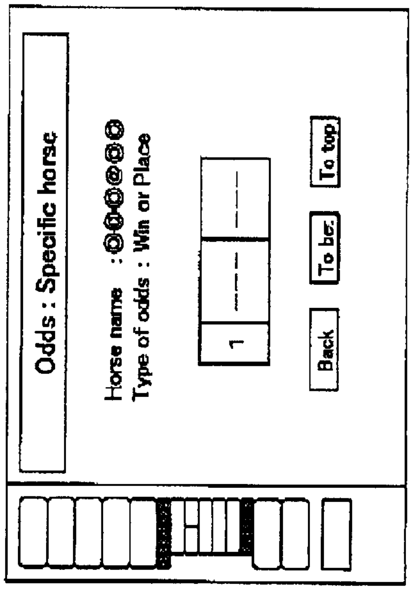

The betting controller 30 manages information relating to the races held. Race information includes, for example, the race schedule, race results (for completed races), odds for races to be held, and detailed information about the horses running in each race. This information is stored in the race information database 32 and is continually updated by the betting controller 30. For example, when a participant clicks on "Race schedule" in the top menu page in FIG. 3, the race schedule screen shown in FIG. 6 is displayed on the user terminal 4. The participant clicks the "Details" button as shown in FIG. 6 when he or she wants to learn the details of races to be held and the race details screen in FIG. 7 is displayed. The participant clicks on the "Race results" button in FIG. 3 when he or she wants to learn the results of races that have already been run and the race results selection screen shown in FIG. 8 is displayed. When the participant clicks on the desired race, the race results screen shown in FIG. 9 is displayed. Furthermore, when a participant clicks on the "Odds" button in FIG. 3, the various odds screen as shown in FIGS. 10 and 11 are displayed. As shown in FIGS. 10 and 11, the participant can view various types of odds for the selected race, such as win or place, bracketed quinella, or quinella.

Figure 12:
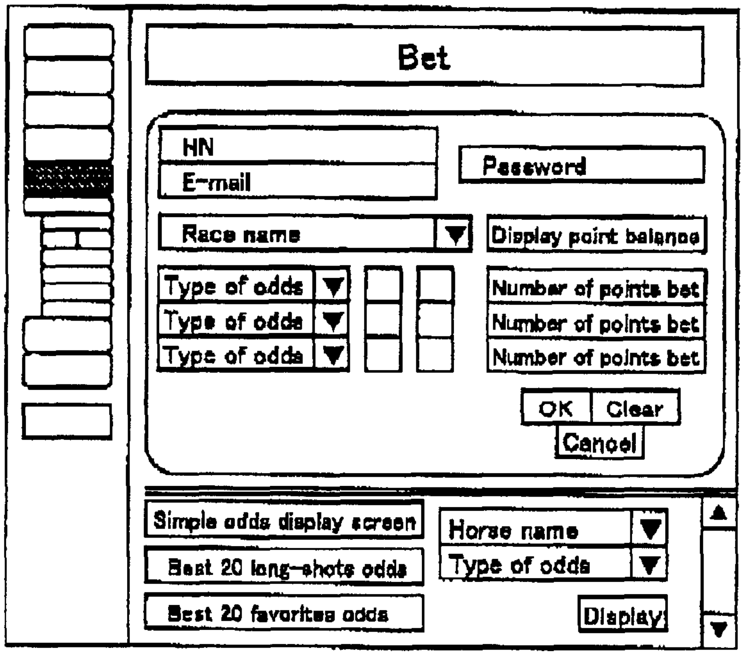
FIG. 12 is an example of a betting procedures screen.
Figure 13:
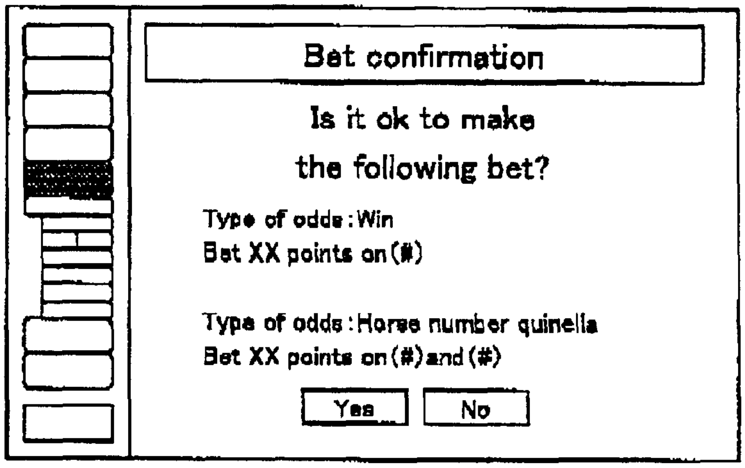
FIG. 13 is an example of a bet confirmation screen.

The betting controller 30 manages the betting procedures of the participants. For example, when a participant clicks on the "Bet" button in the top menu page in FIG. 3, the betting procedures screen shown in FIG. 12 is displayed on the participant terminal 4. In FIG. 12, a participant inputs necessary items such as his or her own participant data and the race name, while inputting betting data including the type of bet, number, and the amount of the bet. Payment of a prescribed amount of virtual money such as 10 points is necessary for one betting amount. Moreover, as shown in FIG. 12, the odds screens may also be displayed in another frame on the betting procedures screen. A participant can thereby go through the betting procedures while viewing the latest odds on the same screen. When the betting data is completely input and the participant clicks the OK button, a bet confirmation screen for confirming the betting data input is displayed as shown in FIG. 13. When the participant confirms the betting data on the screen in FIG. 13, the betting controller 30 stores the participant's betting data in the bet database 33. The bet database 33 contains information such as information for each participant such as names of races bet on by that participant, the type of bets, the numbers of the horses, and the bet amounts. The betting controller 30 subtracts the virtual money corresponding to the total betting amount from the virtual money balance of that participant in the participant database 31.

According to results of races run, the betting controller 30 carries out payoff processing for the bets by participants. As discussed above, the race is run by the game controller 20 in the game server 2; after the race is complete, the betting controller 30 acquires the race results from the game controller 20.

Furthermore, upon receiving the race results from the game controller 20, the betting controller 30 extracts the winners from the betting database 33 on the basis of those race results and calculates the payoff for each winner. Then, the betting controller 30 adds the payoff in the form of virtual money to the point balance of virtual money for each winner stored in the participate database 31 and updates the point balance for each winner. Also, the betting controller 30 appends these of race results for corresponding races in the race information database 32 based on the race results.

Figure 14:
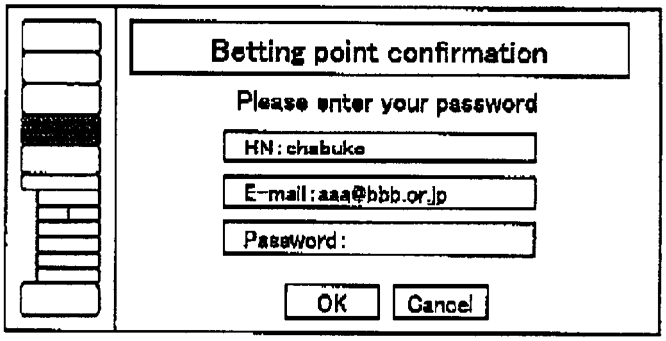
FIG. 14 is an example of a point confirmation screen.
Figure 15:
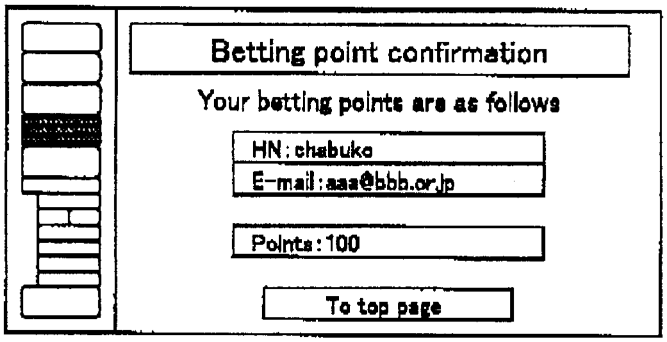
FIG. 15 is an example of a point balance screen.

The participant can confirm the point balance of his or her virtual money. For example, clicking on the "Point confirmation" button in the betting registration screen in FIG. 4 displays the point confirmation screen in FIG. 14. When the participant inputs the prescribed authentication information (password) and clicks OK, the point balance screen shown in FIG. 15 is displayed.

Figure 16:
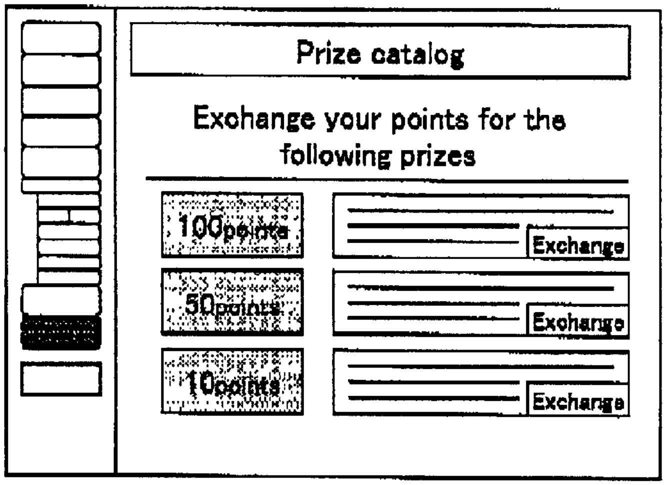
FIG. 16 is an example of a product catalog screen.
Figure 17:
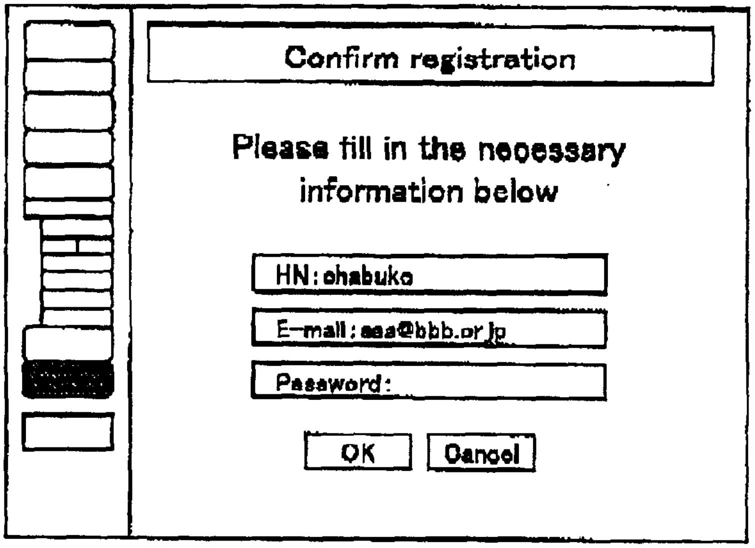
FIG. 17 is an example of an authentication confirmation screen.
Figure 18:
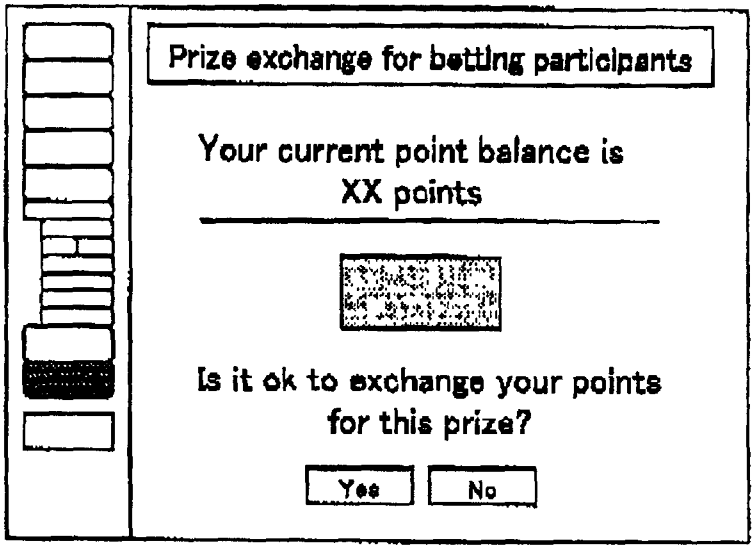
FIG. 18 is an example of a product exchange confirmation screen.
Figure 19:
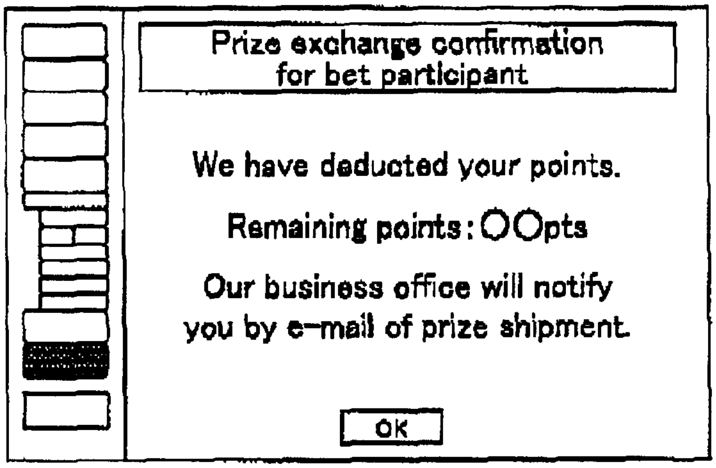
FIG. 19 is an example of a product exchange confirmation screen.

Also, the betting controller 30 performs processing to exchange virtual money for prescribed products. When the participant clicks on "Product catalog" in the top menu page shown in FIG. 3, the product catalog screen shown in FIG. 16 is displayed on the participant terminal 4. While looking at the screen in FIG. 16, the participant selects desired products from within the range of his or her own point balance and clicks "Exchange". Thereupon, the authentication confirmation screen shown in FIG. 17 is displayed and the participant inputs his or her authentication information. The betting controller 30 references the participant database 31 and performs an authentication check; after that the project exchange confirmation screen as shown in FIGS. 18 and 19 is displayed. The betting controller 30 subtracts the points for the exchanged product from the participant database 31 and runs prescribed product shipping procedures.

Figure 20:
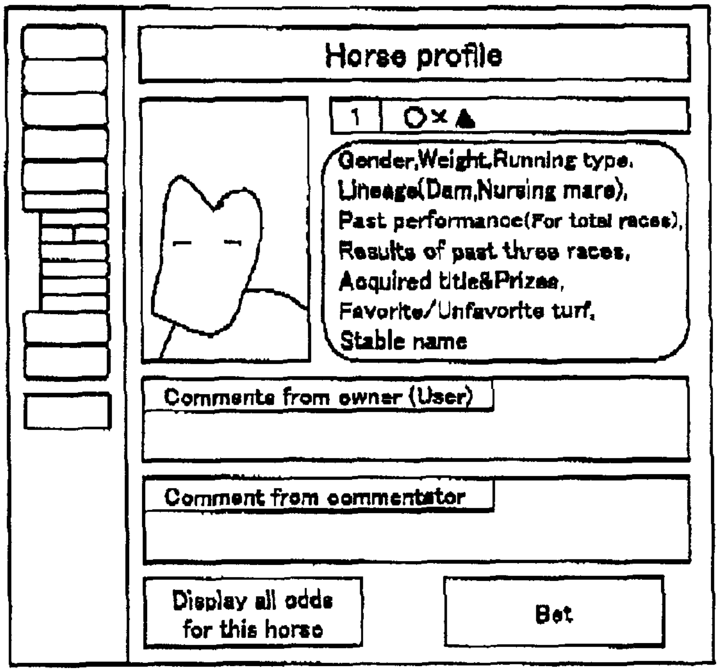
FIG. 20 is an example of a profile screen for each horse.

Clicking the horse number portion in the racing frame in the top menu screen in FIG. 3 causes a profile screen for each horse as shown in FIG. 20 to be displayed.

Figure 21:
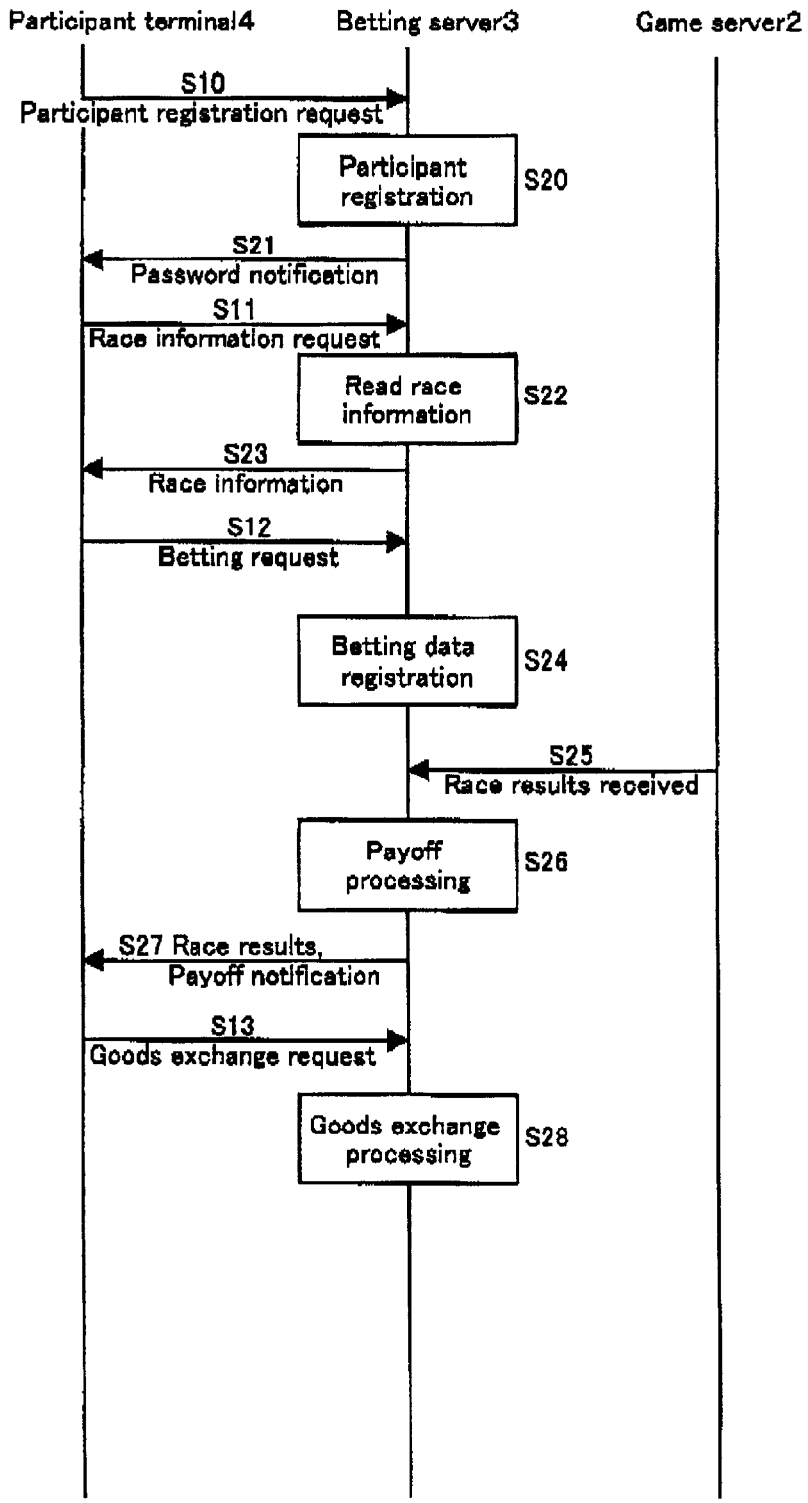
FIG. 21 is a flowchart of the processing between the participant terminal 4 and the betting server 3 in the embodiment.

FIG. 21 is a flowchart of the processing between the participant terminal 4 and the betting server 3 in the present embodiment. A participant operates the participant terminal 4, accesses the betting server 3 through a network, and makes a participant registration request (S10). The betting server 3 registers the participant data in the participant database 31 (S20), while sending a password by electronic mail (S21).

After that, the betting server 3 responds to the race information request from the participant terminal 4 (S11), reads prescribed information from the race information database 32 of race information (race schedule odds, etc.) at anytime (S22), and provides the race information to the participant terminal 4 (S23). The betting server 3 registers betting data in the betting database 33 (S24) according to the betting request from the participant terminal 4 (S12). At this time, the virtual money balance registered in the participant database 31 is updated to reflect a reduction corresponding to the bet amount. Also, a participation fee may be charged to participate in the betting game.

It is also possible to make a bet with cash instead of virtual money. In this case, the participant sends a credit card number when placing the participant registration request and the betting server 3 registers that credit card number in the participant database 31. The participant pays an amount of money (the money bet) corresponding to the bet amount with the registered credit card to the betting server 3. Specifically, the money bet and the participation fee are withdrawn from the account at the financial institution of the registered credit card.

After that, when the betting server 3 receives the race results from the game server 2 (S25), the betting server 3 extracts the winners from the participants in the betting database 33 with the payoff processing, calculates the winnings of the winners, and adds the payoff to the virtual money balance of the winners in the participant database 31 (S26). The betting server 3 then notifies the winners by electronic mail that they have been paid their winnings (S27). In the case of betting with cash, the payoff is transferred to the account in the financial institution of the credit card.

In response to a product exchange request from a participant terminal 4 (S13), the betting server 3 runs the prescribed product exchange processing (S28). At this time, the virtual money corresponding to the exchanged product is subtracted from the virtual money balance in the participant database 31.

Figure 22:
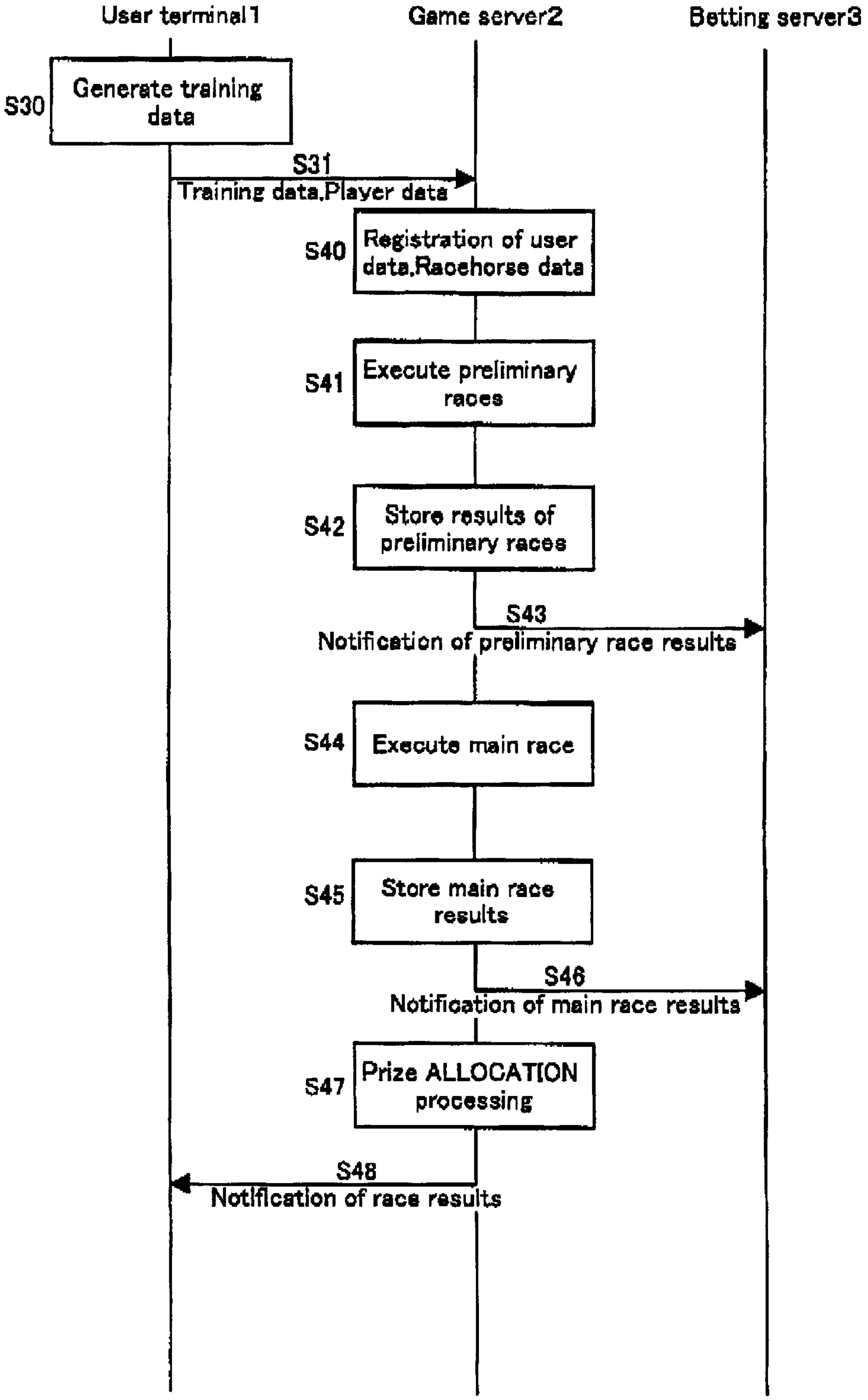
FIG. 22 is a flowchart of the processing between the user terminal 1 and the game server 2 in the embodiment.

FIG. 22 is a flowchart showing the processing between the user terminal 1 in the game server 2. The user operates the user terminal 1 and generates racehorse data in advance by running the racehorse training game (S30), and uploads that training data along with the user data to the game server 2 (S31). The game server 2 registers the user data in the user database 21 and registers the racehorse data in the racehorse database 22 (S40). A prescribed registration fee must be paid in order to register racehorse data; the registration fee is paid in virtual money or cash using a credit card as discussed above.

When the day comes for the preliminary races for a prescribed race, the game server 2 reads the racehorse data stored in the racehorse database 22 and runs the prescribed preliminary races (S41). The results of the preliminary races are stored in the race results database 23 (S42). Also, the results of the preliminary races are sent to the betting server 3 (S43). The betting server 3 stores the preliminary races in the race information database 23 and also generates the stating lineup in the screen in FIG. 3 and race information (such as odds) for the main race.

Furthermore, when the day of the main race arrives, the game server 2 runs the main race with the racehorses who survived the preliminary race (S44), stores the results of that race in the race results database 32 (S45), and notifies the betting server 3 (S46). As discussed above, the betting server 3 carries out the payoff processing based on the race results. Meanwhile, the game server 2 performs the prize money distribution processing for the winning user. Specifically, the game server 2 provides virtual money corresponding to the predetermined prize amount to the user (S47). Also, cash may be paid out. Furthermore, information such as the race results and the allocation of the prize money is distributed by electronic mail (S48). Moreover, the user's virtual money balance is managed by the user database 21; like the participants discussed above, the users may also exchange virtual money for products.

Moreover, the main race may also be carried out before or while the bets are received by the betting server 3. In the words, before a participant places a bet, the main race may already have been run. However, the game server 2 does not publish the race results until the betting server 3 is finished taking bets. Also, the game server 2 may notify the betting server 3 of the race results, but the betting server 3 does not publish the race results until it is finished taking bets. In this way, games that are being bet upon over the network can be executed before bets are placed.

As discussed above, the present embodiment was explained with an example using horseracing over a network, but the network games in the present embodiment are not limited to horseracing. In the example discussed above, the user operates the user terminal, performs the game to develop the racehorse advance, and generates training data for the racehorse. However, instead of the game for developing racehorses, the users can perform games for developing characters such as sports teams like baseball teams and soccer teams. With the character training data generated thereby, competitions such as baseball and soccer games are held on the network and participants can predict and place bets on the winning team. Furthermore, the uploaded data are not limited to training data for the teams and may also include data for enabling competition over the network.

Also, participants may also bet on the competitive games among users on the network that are not limited to competition with the training data generated by users. Competitive games among users over a network include all competitive games such as win or lose type games such as a Japanese chess, car racing, boxing, and typing speed, games to compete for high point scores; and games competing for time scores. Competitive games played by a users over the network are carried out with the user terminals connected to this server and with each relaying and transferring game data to this server. Also, these competitive games are conducted on each user terminal and therefore, the progress of the game and the results of the game are uploaded to the server during or after the game.

Another example of a competitive game is a game for creating an original sports team. For example, in the case of creating a baseball team, the users become virtual team owners. They pick likely looking players from among actual professional baseball players, select those players before the real season begins, and put together a virtual team (original team) matched up by the user independently. The players may be selected from all teams, but it is preferable that the selection be made within a predetermined fixed budget and that the cost of the players correspond to actual annual salaries. Consequently, because a successful player has a high annual salary, the user cannot make a team using only such players. Finding players who will perform well during the season from among those with relatively low salaries is what makes the game interesting.

Figure 23:
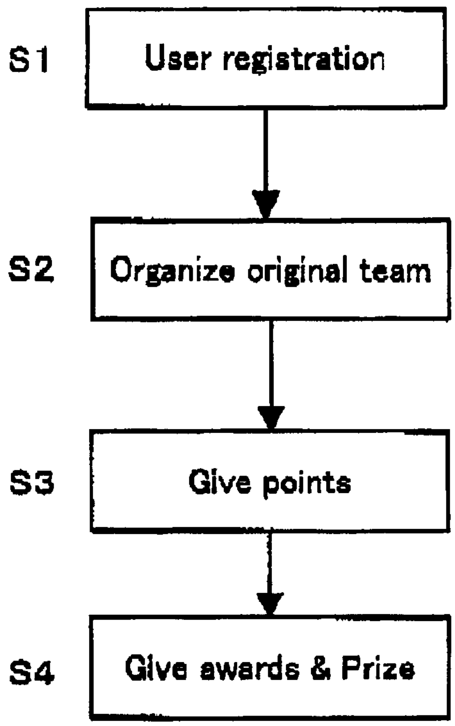
FIG. 23 is a simple flowchart for an original sports team training game.

FIG. 23 is a simple flowchart for a game for making original sports teams. In FIG. 23, the user registers prescribed user data for identifying the user, such as the user name and the electronic mail address, to the game server and pays a registration fee to the server administrator as necessary (S1). The registration fee is paid in virtual money or in cash by credit card, as described above.

The user creates an original team by combining favorite players from a provided player list and staying within a predetermined budget (S2). The original team developed is uploaded to this server over the network and registered in the game server. Moreover, the selected players are classified and registered as regular or reserved players. The game server acquires the data for regular players from the results of actual matches and adds points corresponding to actual player data to the original teams registered (S3). Moreover, the condition of a player is watched throughout the season and the players are switched between regular and reserve status with an aim towards a higher point score.

For fielders, player data includes the batting average, runs batted in, and the number of home runs; and in the case of fielders, this includes the number of wins and losses, earned run average, and strikeouts. The points for each original team are tabulated periodically (for example, every week or every month) or at the end of the season; users compete on the basis of this point score. Consequently, these games for creating original teams are also competitive games for competing for points over a network. Prize money (virtual money) or awards are provided to the user having the original team with the highest number of points (S4).

With the present embodiment, games for betting on the results of such original team training games may be carried out over the network. For example, a participant betting on the top-ranked original team can acquire virtual money based on predetermined odds.

In the present embodiment, the user terminals and participant terminals include various types of terminals which can be connected over a network, such as personal computers, household game devices, portable game terminals, or game-enabled portable phones.

As above, the present invention provides a second network game using the results of a first network game, wherein third party users other than users running a first network game can participate in the first network game. A greater number of users will thereby have interest in the first network game and the first network game will be built up. Also, a greater number of users can participate in a network game through the second network game.

The scope of the present invention is not limited to the abovementioned embodiments and extends over inventions noted in the claims and items equivalent thereto.

What is claimed is:

1. A network game method executed on a server with the participation of users who operate terminals connected to said server through a network, comprising the steps of:

storing character data received over the network from a plurality of terminals respectively associated with a plurality of first users;

receiving a request from at least one terminal respectively associated with at least one second user connected to the server through the network for a betting game, said request including a betting data, the betting game being bet to a competitive game among a plurality of characters based on the character data, and storing the betting data;

after a closing time for bets in said betting game, determining winnings of the betting game based on a result of the competitive game, said result being determined before said closing time for bets in said betting game;

processing winnings of the betting game; and processing prize distributions for any first user who provided the character data which won the competitive game.

2. A network game server for executing a network game with participation of users who operate terminals connected to said server through a network, comprising:

a unit for storing character data received over the network from a plurality of terminals each playing a character training simulation game, said plurality of terminals respectively associated with a plurality of first users;

a unit for receiving a request from at least one terminal respectively associated with at least one second user connected to the server through the network, for a betting game, the request including a betting data, the betting game being bet to a competitive game among the plurality of characters based on the character data, and storing the betting data;

a unit for executing and storing the results of, the competitive game, before a closing time for bets of the betting game;

a unit for determining and processing winnings of the betting game; and a unit for processing prize distribution for any first user who provided the character data which won the competitive game.

3. A computer readable storage medium for storing a plurality of instructions, which when executed by a computer, causes said computer to execute a network game for users who operate terminals connected to the computer through a network, the network game comprising the steps of:

storing character data received over the network from a plurality of terminals respectively associated with a plurality of first users;

receiving a request from at least one terminal respectively associated with at least one second user connected to the server through the network for a betting game, said request including a betting data, the betting game being bet to a competitive game among a plurality of characters based on the character data, and storing the betting data;

after a closing time for bets in said betting game, determining winnings of the betting game based on a result of the competitive game, said result being determined before said closing time for bets in said betting game;

processing winnings of the betting game; and processing prize distributions for any first user who provided the character data which won the competitive game.

* * * * *